United States Patent [19]

Theno

[11] Patent Number: 5,688,098
[45] Date of Patent: Nov. 18, 1997

[54] ROLL TRANSFER SYSTEM

[76] Inventor: Mark H. Theno, 13040 Woodbridge Trail, Minnetonka, Minn. 55305

[21] Appl. No.: 583,155

[22] Filed: Jan. 4, 1996

[51] Int. Cl.$^6$ ............................................. B65G 1/04
[52] U.S. Cl. .................. 414/277; 211/59.1; 414/267; 414/281; 414/663; 414/910; 414/911
[58] Field of Search ................................ 414/267, 277, 414/278, 281, 283, 490, 607, 662, 663, 908, 910, 911; 211/59.1, 94, 105.1

[56] References Cited

U.S. PATENT DOCUMENTS

| | | | |
|---|---|---|---|
| 2,889,907 | 6/1959 | Sullivan | 193/35 |
| 3,040,922 | 9/1962 | Kappea | 414/785 |
| 3,388,806 | 6/1968 | Cunningham, Jr. et al. | 211/59.1 X |
| 3,420,348 | 1/1969 | Caudell | 193/35 |
| 3,503,519 | 3/1970 | Jay | 211/60 |
| 3,881,585 | 5/1975 | Coleman et al. | 193/35 A |
| 3,921,828 | 11/1975 | Suizu | 414/281 X |
| 4,005,793 | 2/1977 | Smith | 414/607 |
| 4,089,399 | 5/1978 | Webb | 193/35 SS |
| 4,153,211 | 5/1979 | Lenk et al. | 414/911 X |
| 4,182,440 | 1/1980 | Juevgers | 193/35 A |
| 4,223,792 | 9/1980 | Aspen | 211/162 |
| 4,765,493 | 8/1988 | Kinney | 211/59.2 |
| 4,988,252 | 1/1991 | Yamamoto et al. | 414/908 X |
| 5,087,164 | 2/1992 | Mukaimoto | 414/282 |
| 5,274,984 | 1/1994 | Fukuda | 414/911 X |
| 5,295,591 | 3/1994 | Slater | 211/59.2 |
| 5,297,919 | 3/1994 | Reichental et al. | 414/908 X |
| 5,372,469 | 12/1994 | Kobayashi | 414/910 X |
| 5,433,572 | 7/1995 | Swain et al. | 414/910 X |
| 5,437,528 | 8/1995 | Decker | 414/908 X |
| 5,466,114 | 11/1995 | Swain | 414/910 X |
| 5,503,277 | 4/1996 | O'Brien | 211/59.1 X |

FOREIGN PATENT DOCUMENTS

| | | | |
|---|---|---|---|
| 7558 | 1/1977 | Japan | 414/908 |
| 94012314 | 6/1994 | WIPO | 414/607 |

*Primary Examiner*—David A. Bucci
*Attorney, Agent, or Firm*—Jacobson & Johnson

[57] ABSTRACT

A transfer system including a roll holder having an upright member with a support member extending in a cantilevered fashion outward from the upright member with the support member including a set of rollers for rollably supporting a roll of material thereon and a detachably mounted roll stop for connecting to the support member so that when the roll of material is to be placed on the support member the roll stop can be readily detached to permit placing the roll of material on the support member and can be readily attached to the support member to prevent the roll of material on the support member from accidentally rolling off the support member.

10 Claims, 3 Drawing Sheets

ROLL TRANSFER SYSTEM

FIELD OF THE INVENTION

This invention relates generally to roll storage devices and, more specifically, to roll storage devices that permit the safe transfer of heavy rolls of material with little effort.

BACKGROUND OF THE INVENTION

One of the difficulties with moving of rolls of heavy material is that the rolls are usually relatively large and can not be lifted without the aid of a mechanical lift of some type. Normally, the rolls of material are stored on end or are stacked in a storage rack and moved about with front end loaders. The present invention provides a storage rock that permits storage of a roll of material by supporting a core of the roll on a cantilevered arm that extends through the roll of material. In order to permit a roll to be moved on and off the cantilevered arm there are included a set of rollers that project upward from the cantilevered arm sufficiently so as to engage the core to permit the roll of material to be rolled along the cantilevered arm. In order to prevent the rolls from accidentally rolling off the cantilevered arms there is included a detachable roll stop. The roll stop includes a ring-like member having a chain link with a hook thereon. The ring-like member has a dimension that is sufficiently large so as not to lit through the core of a roll of material and thus prevent the roll of material from accidently falling off the cantilevered arm. The hook and link arrangement permit one to quickly and easily attach or detach the roll stop from the cantilevered arm.

BRIEF DESCRIPTION OF THE PRIOR ART

U.S. Pat. No. 5,087,164 shows a roll storage rack where the core ends of the roll of material are used to support the rolls in the storage rack. A pickup flatcar runs along the rails to pick up the rolls of material.

U.S. Pat. No. 2,889,907 shows a conveyor for article storage with the rails including multiple rollers for directing articles therealong.

U.S. Pat. No. 3,040,922 shows an articulated arm for use in transporting materials on pallets or the like. The arm includes roller to define a relatively friction free upper surface.

U.S. Pat. No. 3,420,348 shows a storage rack with rail members having rollers thereon for moving pallets along the rail members.

U.S. Pat. No. 3,503,519 shows a material with sling clearance to permit the transfer of long flexible stock.

U.S. Pat. No. 3,881,585 shows a self-leveling conveyor with a stop for arresting the movement of articles on a conveyor.

U.S. Pat. No. 4,005,793 shows a ram for a lift truck with the ram having an elongated bar to engage the roll stock.

U.S. Pat. No. 4,089,399 shows a device for use in mechanical handling of articles such as pallets.

U.S. Pat. No. 4, 182,440 shows a pallet feeding apparatus which includes track members with rollers thereon.

U.S. Pat. No. 4,223,792 shows a rack for storing pipes rods and the like with a carriage mounted in the rack for lifting the materials.

U.S. Pat. No. 4,765,493 shows a gravity feed rack with rollers on the rack for directing the material to one side of the rack.

U.S. Pat. No. 5,274,984 shows a method and system for making packages with a fork that can lilt the rolls of material from horizontally extending support rods.

U.S. Pat. No. 5,295,591 shows a storage rock with angled support members having rollers thereon which direct the articles such as batteries to one side of the storage rack.

SUMMARY OF THE INVENTION

Briefly, the invention comprises a storage rack or roll holder that permits storing or transporting of rolls of heavy material with the storage rack including a cantilevered arm having rollers thereon to roll a heavy roll of material on or off a cantilevered arm. The free end of the cantilevered arm includes a free-hanging detachably mounted roll stop connecting to the cantilevered arm so that when the roll of material is to be placed on the cantilevered arm the roll stop can be readily detached to permit placement of the roll of material on the cantilevered arm and thereafter can be readily attached to the cantilevered arm to prevent the roll of material on the cantilevered arm from accidentally rolling off the cantilevered arm.

DESCRIPTION OF THE PREFERRED EMBODIMENT

Figure 1:
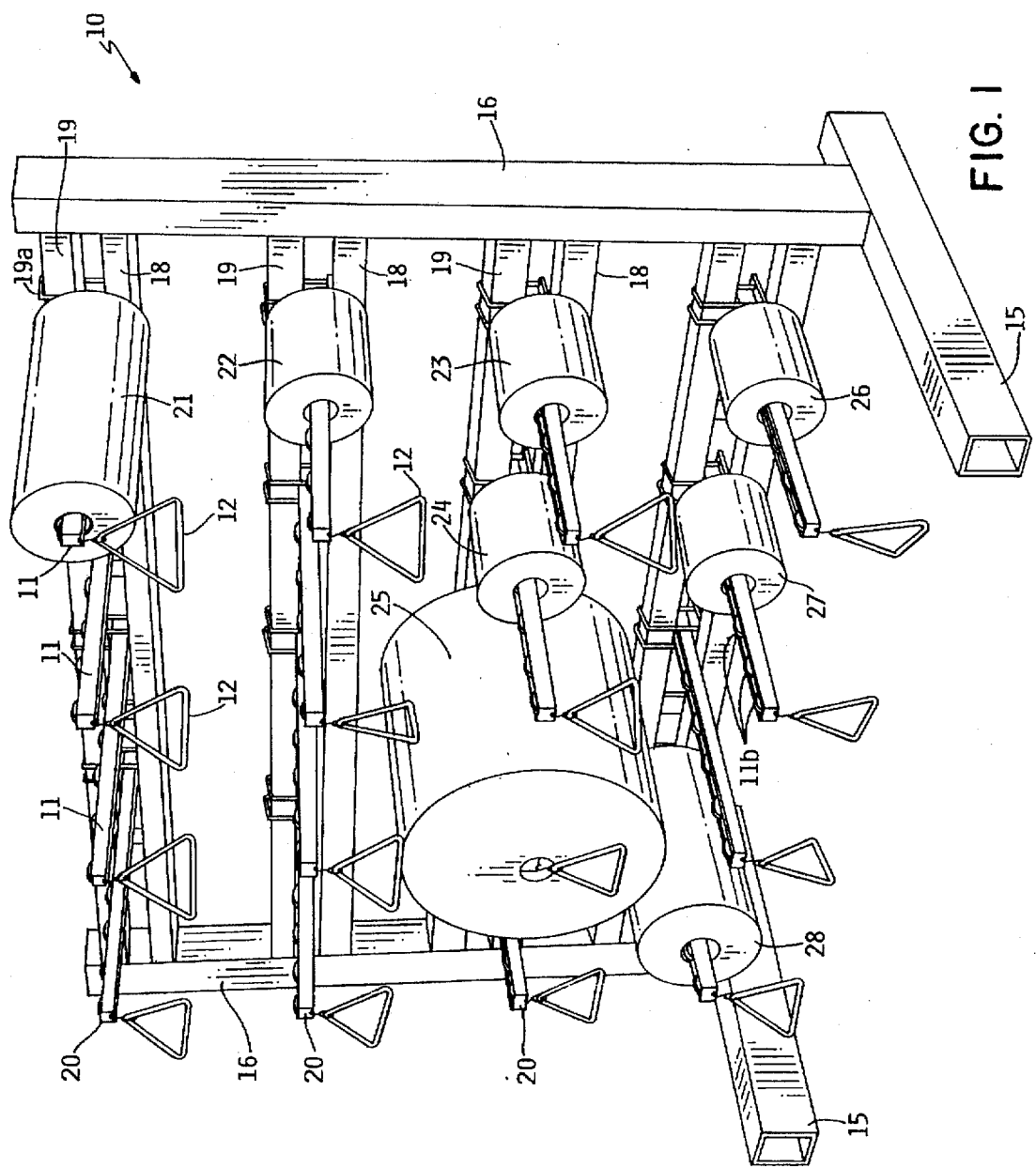
FIG. 1 shows a perspective view of a stationary roll holder having a plurality of cantilevered arms with detachable roll stops.

FIG. 1 shows a perspective view of a storage rack comprising a stationary roll holder 10 having a plurality of horizontally extending cantilevered arms 11 each having a free-hanging detachable roll stop 12. The free-hanging roll stop 12 provides an afar visual indication to a person that a roll of material is secured to the support member or cantilevered arm 11. That is the roll stop 12 is visible from a distance so that a person can check whether the roll-stop is in place without actually having to be next to the mechanism. Roll holder 10 includes a stationary frame comprised of a set of base members 15 which support a pair of vertical uprights 16. Extending from upright to upright are a set of cross members 18 and 19. Cross members 18 and 19 coact with uprights 16 and base members 15 to provide a stationary base for securing a plurality of cantilevered arms or roll support members 11 therefrom. Located on cantilevered arms 11 are rolls of material designated by reference numerals 21, 22, 23, 24, 25, 26, 27 and 28 with a cantilevered arm extending cantilevered arm extending through each of the cores of the rolls of material. Cantivlelvered arms 11 are laterally positionable through members 18 and 19 and U-bolt 19a. That is member 18 is positioned forward as a fulcrum and member 19 is positioned rearward to support the unfree end of the cantilevered arms 11. U-bolt 19a can be loosened to permit a person to slide the unfree end of cantilevered arm between members 18 and 19 to thereby laterally position arms 11 for smaller or larger rolls of material.

Figure 2:
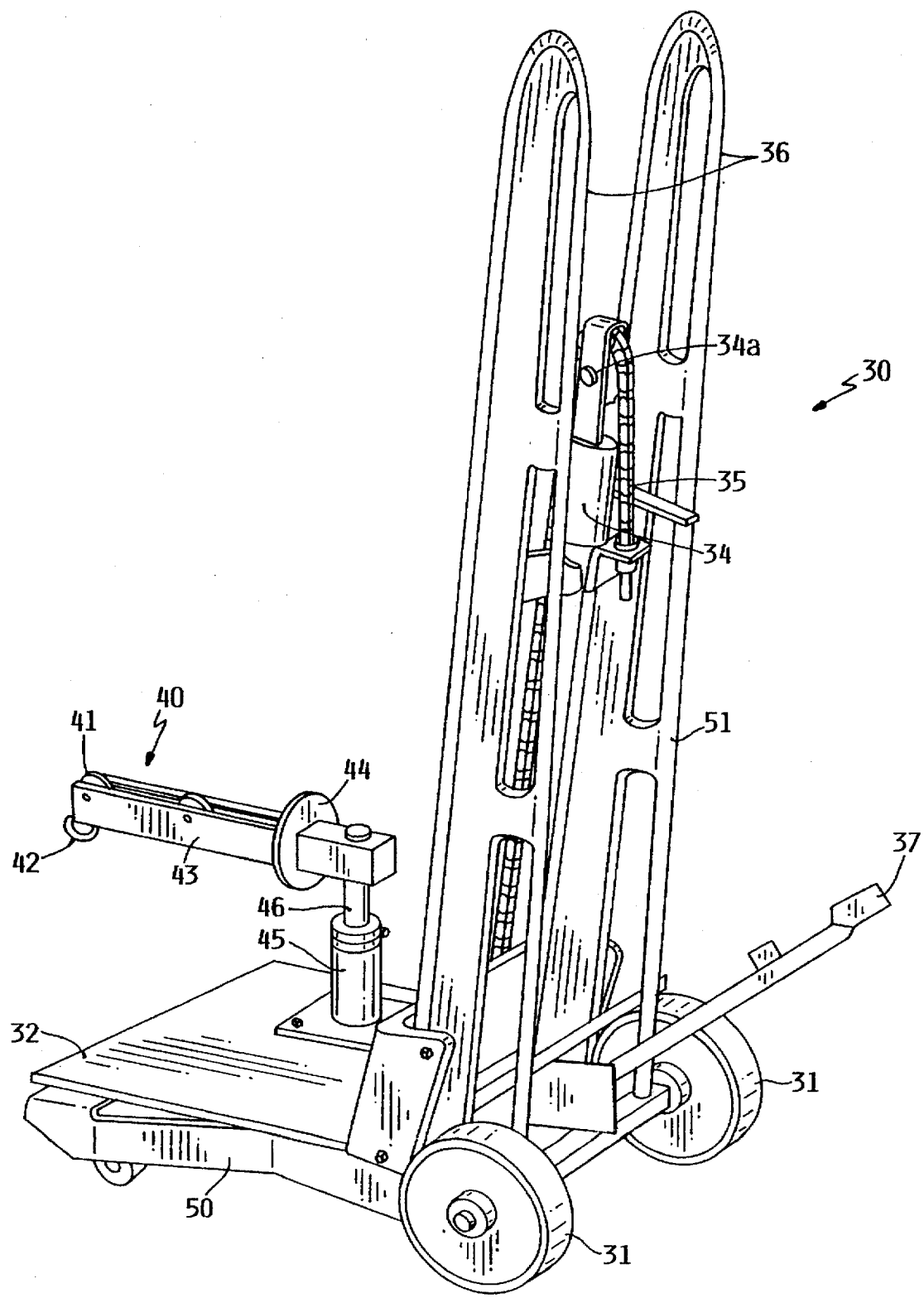
FIG. 2 is a prospective view of a portable roll holder mounted on platform that can be raised or lowered.

FIG. 2 is a perspective view of a portable roll holder 30 mounted on a platform 32 that can be raised or lowered. Portable roll holder 30 includes an L-shaped frame comprised of a base 50 and an upright 51 with a pair of handles 36 attached to upright 51. A hydraulic cylinder 34 connects to a chain 35 which in turn connects to platform 32 and upright 51. A foot pedal 37 allows one to increase the pressure in the hydraulic cylinder 34 to extend member 34a to thereby raise platform 32 through the coaction with chain 35. That is, extending arm 34a causes chain 35 to move upward and thus pull upward platform 32. Located on platform 32 is a pedestal 45 which is secured to platform 32 through bolts or the like. Pedestal 45 includes a shaft 46 that has a first end journaled in pedestal 45 to permit rotation of shaft 46 within pedestal 45. A latching mechanism (not shown) allows one to lock shaft 46 in pedestal 45. The opposite end of shaft 46 supports a cantilevered arm 40 that includes a set of top rollers 41, a hook 42 for a detachable roll stop and a back stop 44. Cantilevered arm 40 is formed from a generally C-shaped metal member and includes an elongated opening extending therealong.

Figure 3:
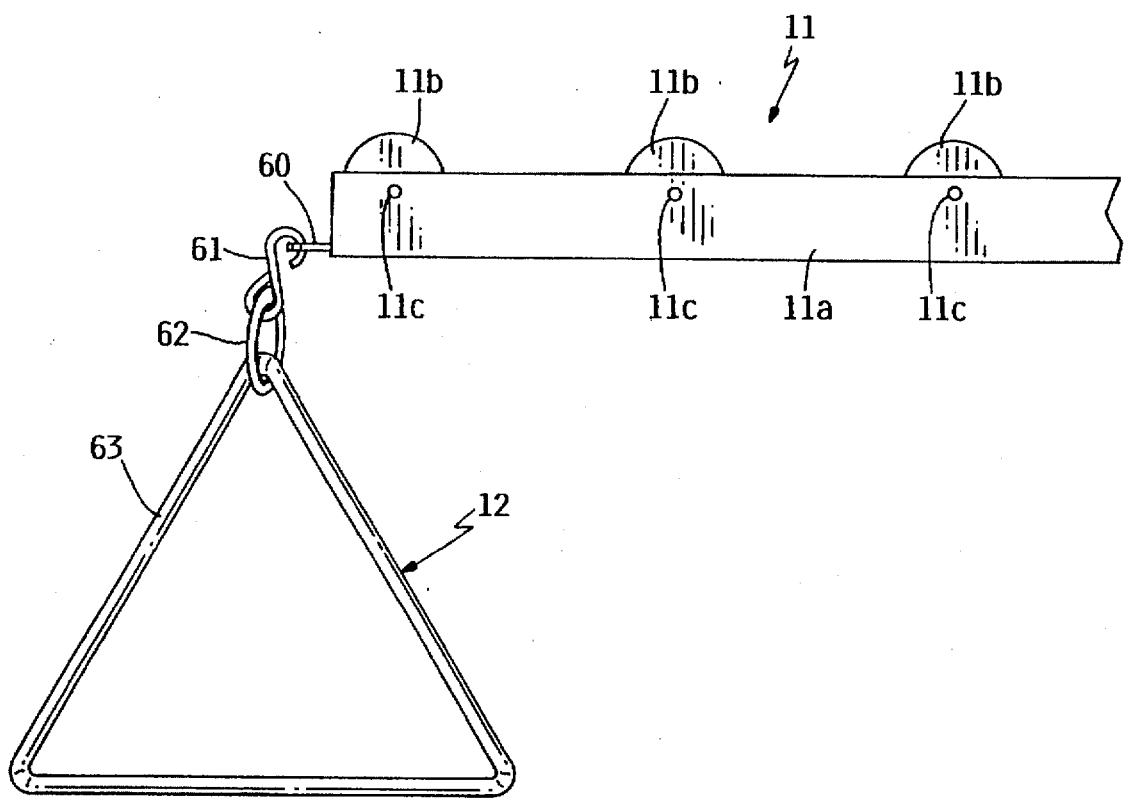
FIG. 3 shows a partial side view of the cantilevered arm with a detachable roll stop connected to the end of the cantilevered arm.

FIG. 3 shows a partial side view of cantilevered arm 11 with a detachable roll stop 12 connected to the end of the cantilevered arm 11. As cantilevered arms 11 are identical to one another only one will be described.

Figure 4:
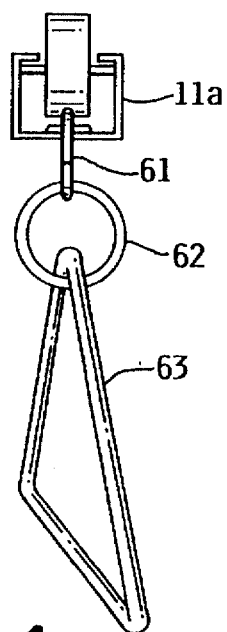
FIG. 4 shows an end view of the cantilevered arm of FIG. 3.

Referring to FIG. 3 and FIG. 4, reference numeral 11a identifies a cantilevered arm or support member 11 with a generally C-shaped cross section. Located in a spaced relationship are a set of rollers 11b which are supported by respective shafts 11c extending from one side of member 11a to the opposite side of member 11a. A loop 60 extends outward from one end of member 11. Loop 60 is secured to member 11 by welding or the like. Attached to loop 60 is free-hanging detachable roll stop 12 which comprises a triangular shaped ring-like member 63 having a link 62 and a hook 61 for attachment to loop 60. Member 63 is shown comprising a metal triangular shaped member that has an outside dimension sufficiently large so that the core of a roll of material can not pass over roll stop 12. Roll stop 12 is detachably mounted to the cantilevered support member 11 so that when the roll of material is to be placed on the support member the roll stop 12 can be readily detached from support member 11 to permit placement of the roll of material on support member 11. Once the roll is on the support member the stop can be readily attached to the support member 11 to prevent the roll of material on the support member from accidentally rolling off the support member. An advantage of the free-hanging roll stop 12 is that a person can readily determine if the roll stop is in position and thus avoid dangerous problems which might result from a person not noticing that roll stop 12 was not engaged.

Portable roll holder 30 and stationary roll holder 10 when used in conjunction with each other provide a transfer system. That is, one part of the transfer system is the first stationary storage member 10 having a plurality of cantilevered arms 11 for receiving a roll of material and the second part of the transfer system is the portable roll holder having a cantilevered arm 40 that can be raised or lowered into alignment with a cantilevered arm 11 on the stationary storage member 10. Once in alignment the roll of material can be transferred from the portable storage rack to the stationary rack by pushing the roll of material from one cantilevered arm to another. Cantilevered arms 11 are maintained at substantially a horizontal position to facilitate transfer of rolls to and from cantilevered arms 11.

FIG. 1 shows the stationary portion of the transfer system which includes cantilevered support arm 11 which has a top side with the top side including a set of protruding rollers 11b spaced longitudinally therealong to permit a core to be moved along the cantilevered arm 11 with a minimum of force. FIG. 3 and 4 show the cantilevered arm 11 which includes a free end with a loop member 60 thereon for hook-like attachment to a loop on a support arm.

FIG. 2 shows the second part of the transfer system having a cantilevered arm 40 with the cantilevered arm having a free end and a further end connected through a pedestal 45 to a vertically elevateable platform 31. The cantilevered arm 40 includes a top side with the top side including a set of protruding rollers 41 spaced longitudinally therealong to permit a core to be easily moved along cantilevered arm 40. The cantilevered arm 40 includes a free end with a loop member 42 hereon for engagement with a removable stop such as shown in FIG. 1. The purpose of the hook-like attachment or detachment of a removable stop 12 thereon is so that if a person wishes to transfer a roll of material from one location to another the person can move portable roll holder to a position where a roll of material can be loaded on cantilevered support arm 40. The user can raise or lower cantilevered support arm 40 through platform 40 and hydraulic cylinder 34. When at the destination the person can quickly transfer a roll of material from one roll holder to the other roll holder by positioning the respective cantilevered arms 11 in an end to end fashion and removing the removable stops 12. This allows a person to move a heavy roll of material from one member to the other by sliding the roll from one cantilevered arm 40 to the other cantilevered arm 11 without requiring any lifting of the roll of material by the person.

I claim:

1. A roll holder comprising:

a frame a support member having a first end attached to the frame and a second end extending horizontally outward in a cantilevered fashion from said frame;

a set of rollers located on a top portion of said support member, said respective set of rollers extending substantially vertically upward from said support member so as to rollably support a roll of material thereon;

a free-hanging roll stop, said roll stop detachably mounted to said second end of said support member so that when the roll of material is to be placed on the support member the roll stop can be readily detached and removed to permit placing the roll of material on the support member and can be readily reattached to the support member after the roll of material is placed on the support member to prevent the roll of material on the support member from accidentally rolling off the support member; and a loop connector for attaching said roll stop thereto.

2. The roll holder of claim 1 wherein said frame includes a plurality of support members each having a set of rollers thereon.

3. The roll holder of claim 1 wherein the roll stop includes a hook for engaging the connector.

4. The roll holder of claim 1 wherein the roll stop comprises a ring-like member having a dimension that is sufficiently large so as to preclude the ring-like member from passing through the opening in a roll of material.

5. The roll holder of claim 1 wherein the frame includes a metal base.

6. The roll holder of claim 1 wherein the support member is mounted on a lift.

7. The roll holder of claim 6 wherein the support member is pivotable to permit horizontal positioning of said support member.

8. The roll holder of claim 7 wherein said lift includes wheels for moving said roll holder about.

9. The roll holder of claim 8 wherein said lift includes means for raising and lowering said roll holder.

10. A transfer system comprising:

a first storage member having a cantilevered arm, said cantilevered arm having a free end and a further end attached to a storage rack, said cantilevered arm having a top side with the top side including a set of protruding rollers spaced longitudinally therealong to permit a core to be moved along said cantilevered arm, said cantilevered arm including a free end with a loop member thereon for hook-like attachment to a stop; and a second member having a cantilevered arm with the cantilevered arm the second member including cantilevered arm having a free end and a further end attached to vertically elevatable housing, said cantilevered arm on said second member having a top side with the top side including a set of protruding rollers spaced longitudinally therealong to permit a core to be moved along said cantilevered arm on said second member, said cantilevered arm on said second member including a free end with a loop member thereon for hook-like attachment or detachment of a stop to thereby permit a person to transfer a roll from the second member to the first storage member by positioning the respective cantilevered arms in an end to end fashion while moving a roll of heavy material from one member to the other.

* * * * *